United States Patent
Bolz et al.

(10) Patent No.: US 8,970,608 B2
(45) Date of Patent: Mar. 3, 2015

(54) STATE OBJECTS FOR SPECIFYING DYNAMIC STATE

(75) Inventors: Jeffrey A. Bolz, Austin, TX (US); Eric S. Werness, San Jose, CA (US); Jerome F. Duluk, Jr., Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1006 days.

(21) Appl. No.: 13/078,867

(22) Filed: Apr. 1, 2011

(65) Prior Publication Data

US 2011/0242118 A1 Oct. 6, 2011

Related U.S. Application Data

(60) Provisional application No. 61/321,094, filed on Apr. 5, 2010.

(51) Int. Cl.
| G06T 1/00 | (2006.01) |
| G06T 15/00 | (2011.01) |
| G06F 9/30 | (2006.01) |
| G06F 9/38 | (2006.01) |

(52) U.S. Cl.
CPC ............ G06T 15/005 (2013.01); G06F 9/3009 (2013.01); G06F 9/3851 (2013.01); G06F 9/3879 (2013.01); G06F 9/3891 (2013.01); G06T 1/00 (2013.01)

USPC .......................................... 345/522; 345/501

(58) Field of Classification Search
CPC ........ G06F 9/3891; G06T 15/005; G06T 1/20
USPC .................................................. 345/501, 522
See application file for complete search history.

(56) References Cited

U.S. PATENT DOCUMENTS

| 6,518,976 B1 * | 2/2003 | Curtis et al. .................. 345/621 |
| 6,975,325 B2 * | 12/2005 | Morein et al. ................ 345/557 |
| 7,473,293 B2 * | 1/2009 | Nakajima ..................... 712/210 |
| 7,634,637 B1 * | 12/2009 | Lindholm et al. .............. 712/22 |
| 2012/0218278 A1 * | 8/2012 | Marketsmueller ............ 345/522 |

* cited by examiner

*Primary Examiner* — Joni Richer
(74) *Attorney, Agent, or Firm* — Patterson & Sheridan, LLP

(57) ABSTRACT

One embodiment of the present invention sets forth a technique for transmitting state information associated with at least one graphics command to a graphics processor. The method includes the steps of generating a state object that specifies a set of properties that is needed to execute a first graphics command within the graphics processor, storing in the state object a value associated with a first property included in the set of properties, marking a second property included in the set of properties as a dynamic property, where a value associated with the second property is not stored in the state object and can be updated without having to modify the state object, and transmitting the state object to the graphics processor in order to execute the first graphics command.

21 Claims, 11 Drawing Sheets

STATE OBJECTS FOR SPECIFYING DYNAMIC STATE

CROSS-REFERENCE TO RELATED APPLICATIONS

This application claims benefit of U.S. provisional patent application entitled "GPU Work Creation and Stateless Graphics in OPENGL" filed on Apr. 5, 2010 and having a Ser. No. 61/321,094.

BACKGROUND OF THE INVENTION

1. Field of the Invention

The present invention relates generally to the field of parallel processing and, more specifically, to state objects for specifying dynamic state.

2. Description of the Related Art

In a typical processing environment, and especially in a graphics processing environment, there is a large amount of state information that is transmitted by an application to facilitate the processing of input data in a processing pipeline. The state information is transmitted by the application executing in a central processing unit (CPU) to an external processing unit, such as a graphics processing unit (GPU), via a driver.

Some pieces of state are simple 32-bit integer or floating-point values, and applications commonly use a wide variety of possible values for this type of state. For such "dynamic" state, it is undesirable to require a unique state object for each different value or combination of values. Other types of "static" state are expected to change at a lower frequency and have a smaller set of possible values.

In view of the differences between dynamic and static state information, an efficient mechanism for transmitting dynamic state information to an external processing unit is highly desirable. In prior art techniques, state objects that store state information are configured such that "dynamic" state stored within those state objects must be re-specified each time a state object is used. However, it is undesirable to require applications to re-specify dynamic state at each use, especially in cases when there is a large number of dynamic states.

As the foregoing illustrates, what is needed in the art is a mechanism for efficiently transmitting mixed static and dynamic state information to an external processing unit.

SUMMARY OF THE INVENTION

One embodiment of the present invention is a computer-implemented method for transmitting state information associated with at least one graphics command to a graphics processor. The method includes the steps of generating a state object that specifies a set of properties that is needed to execute a first graphics command within the graphics processor, storing in the state object a value associated with a first property included in the set of properties, marking a second property included in the set of properties as a dynamic property, wherein a value associated with the second property is not stored in the state object and can be updated without having to modify the state object, and transmitting the state object to the graphics processor in order to execute the first graphics command.

generating a state object that specifies a set of properties that is needed to execute a first graphics command within the graphics processor, storing in the state object a value associated with a first property included in the set of properties, marking a second property included in the set of properties as a dynamic property, where a value associated with the second property is not stored in the state object and can be updated without having to modify the state object, and transmitting the state object to the graphics processor in order to execute the first graphics command.

Advantageously, because values for dynamic properties are not stored in the state object, those values are separately provided by the application program 101 each time the state object is to be used. Such a set-up allows for the state object to be shared between different threads executing within the graphics processing pipeline and across different graphics commands.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one skilled in the art that the present invention may be practiced without one or more of these specific details. In other instances, well-known features have not been described in order to avoid obscuring the present invention.

System Overview

Figure 1:
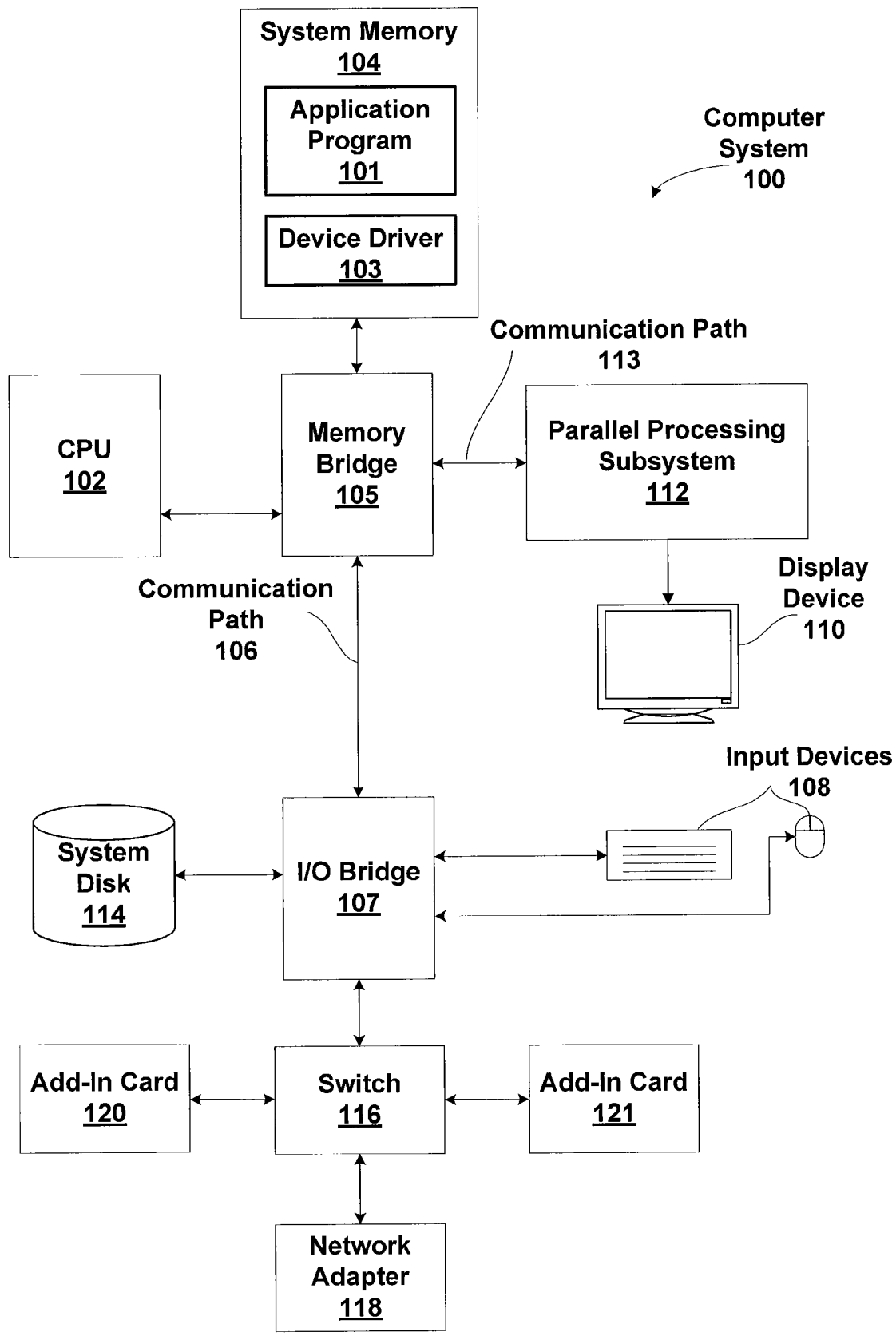
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

The system memory 104 includes an application program 101 and device driver 103. The application program 101 generates calls to a graphics API in order to produce a desired set of results, typically in the form of a sequence of graphics images. The application program 101 also transmits one or more high-level shading programs to the graphics API for processing within the device driver 103. The high-level shading programs are typically source code text of high-level programming instructions that are designed to operate on one or more shaders within the parallel processing subsystem 112. The graphics API functionality is typically implemented within the device driver 103.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
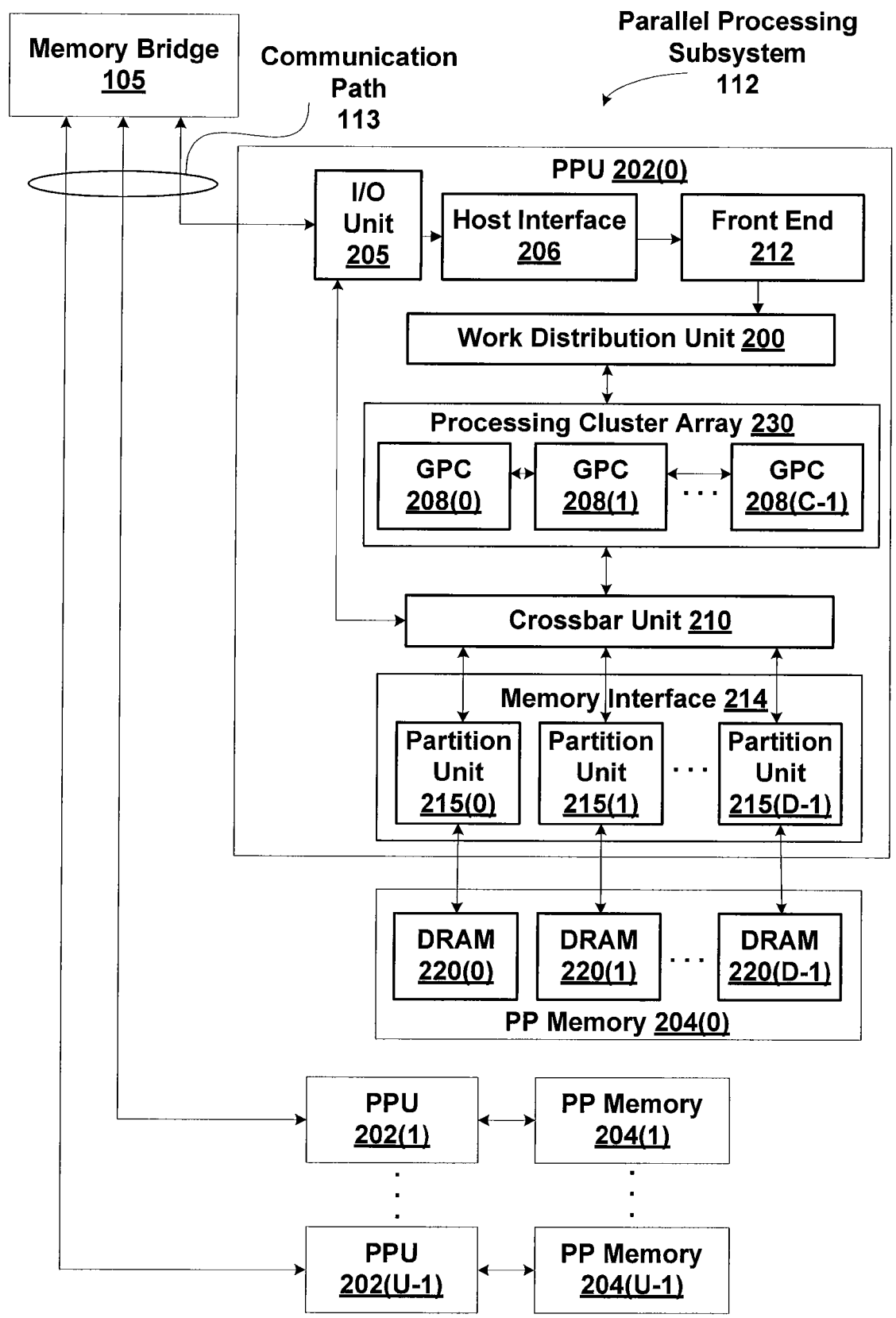
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
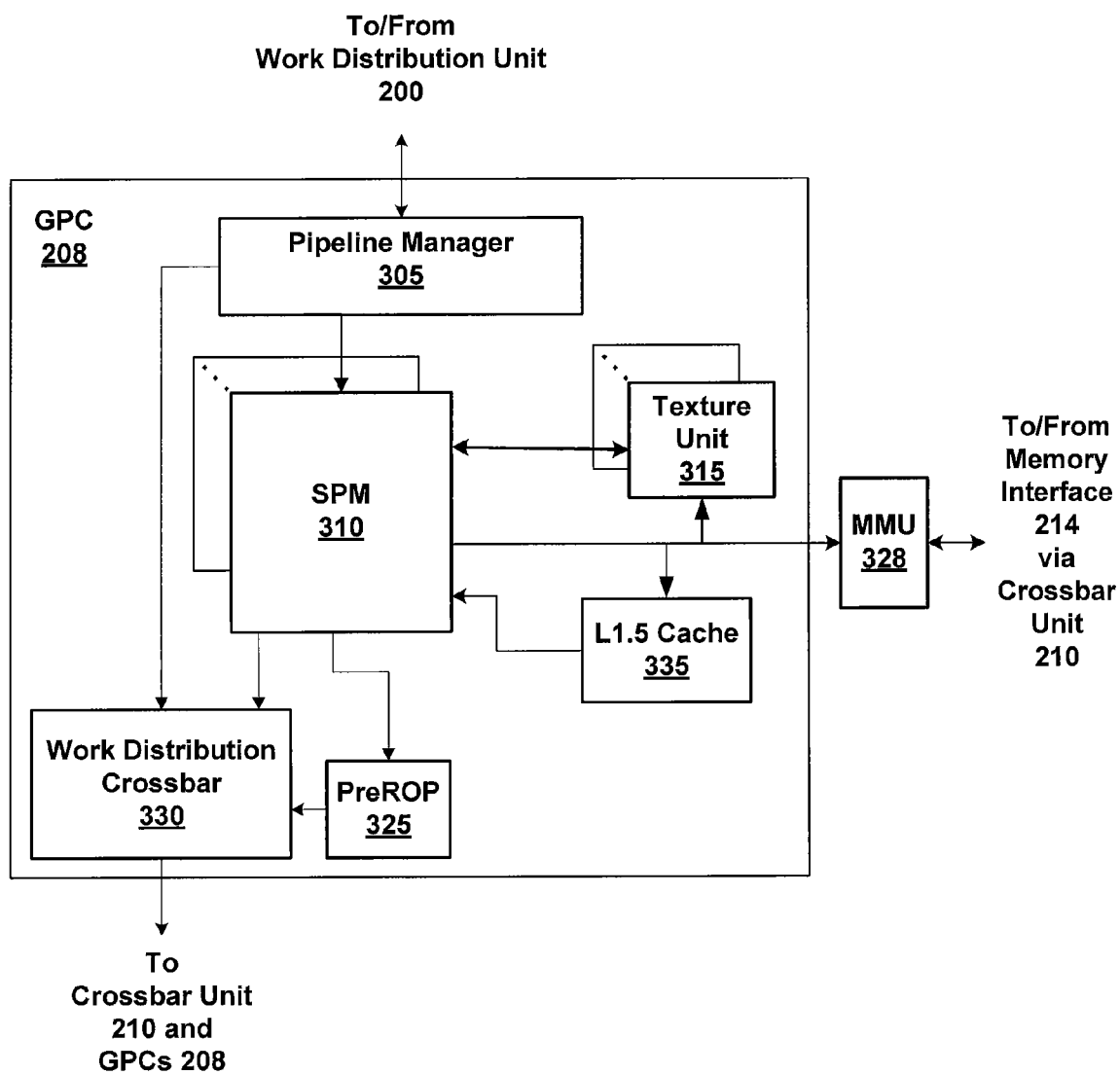
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
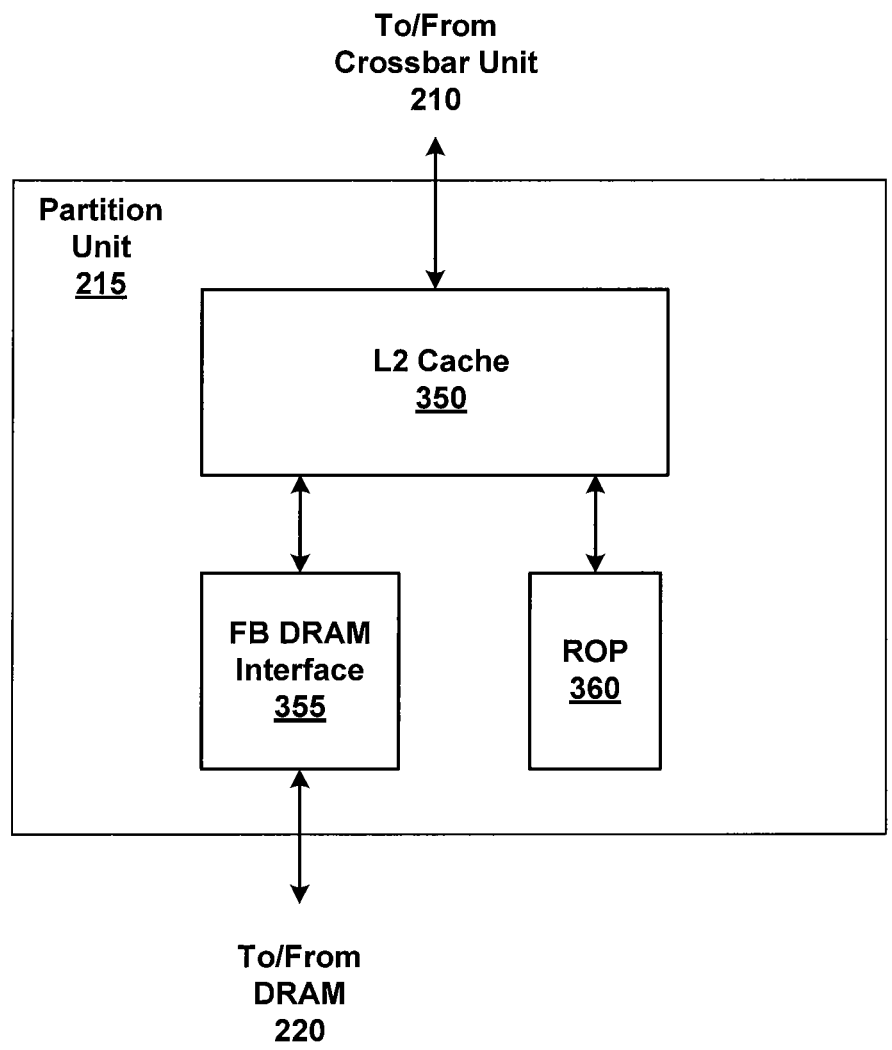
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CIA" and "thread array" are used synonymously herein.

Figure 3C:
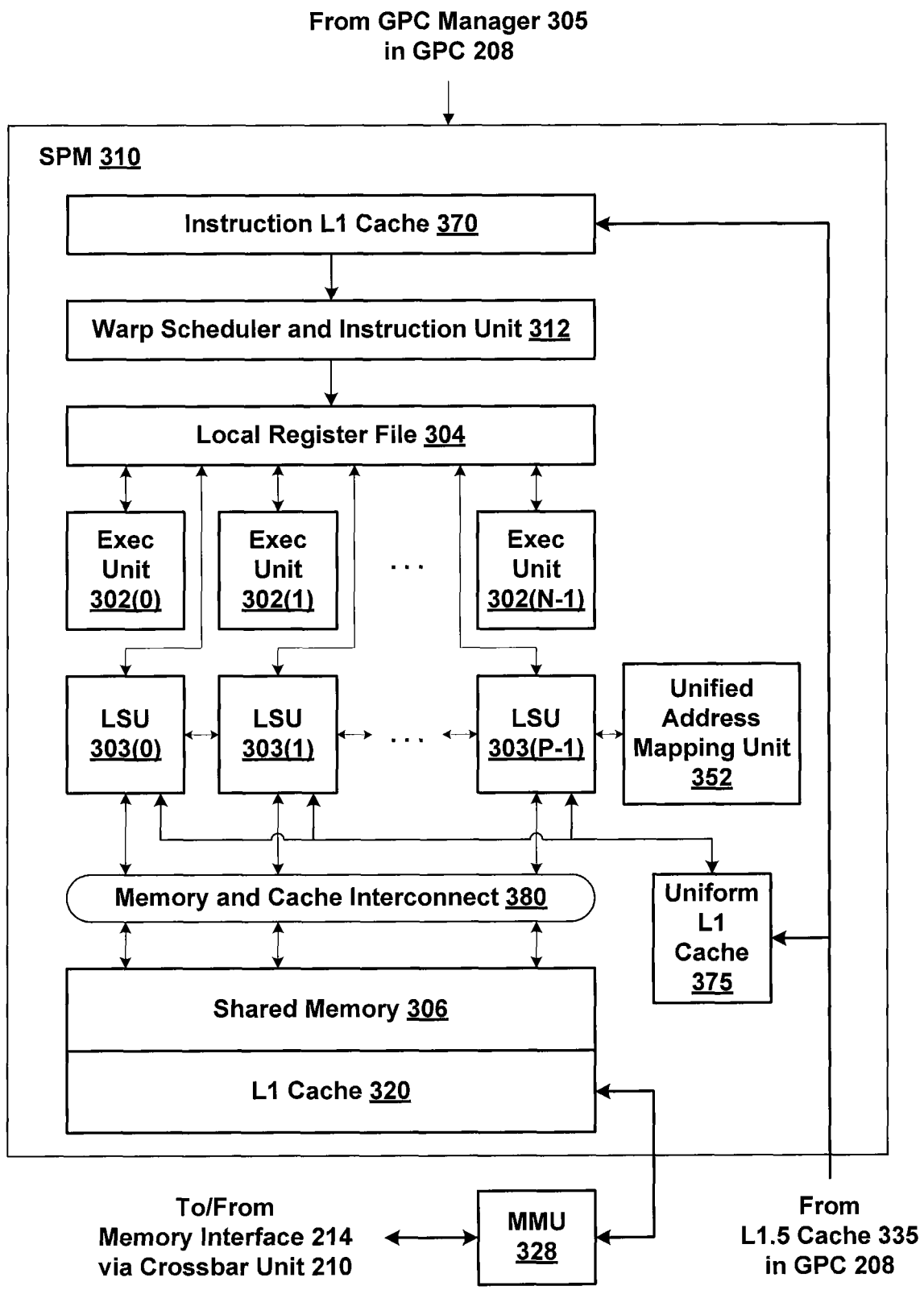
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

Graphics Pipeline Architecture

Figure 4:
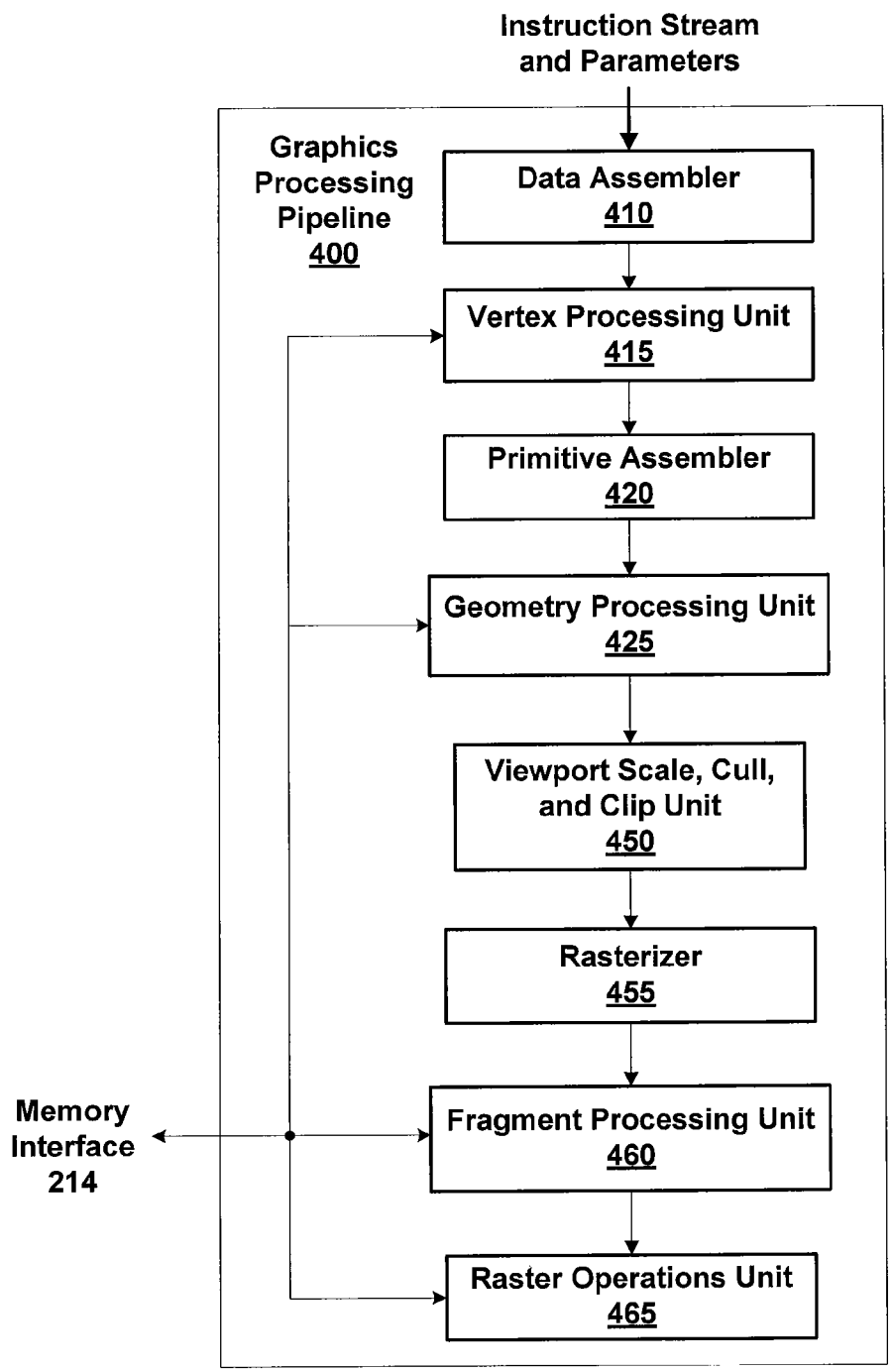
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Figure 5:
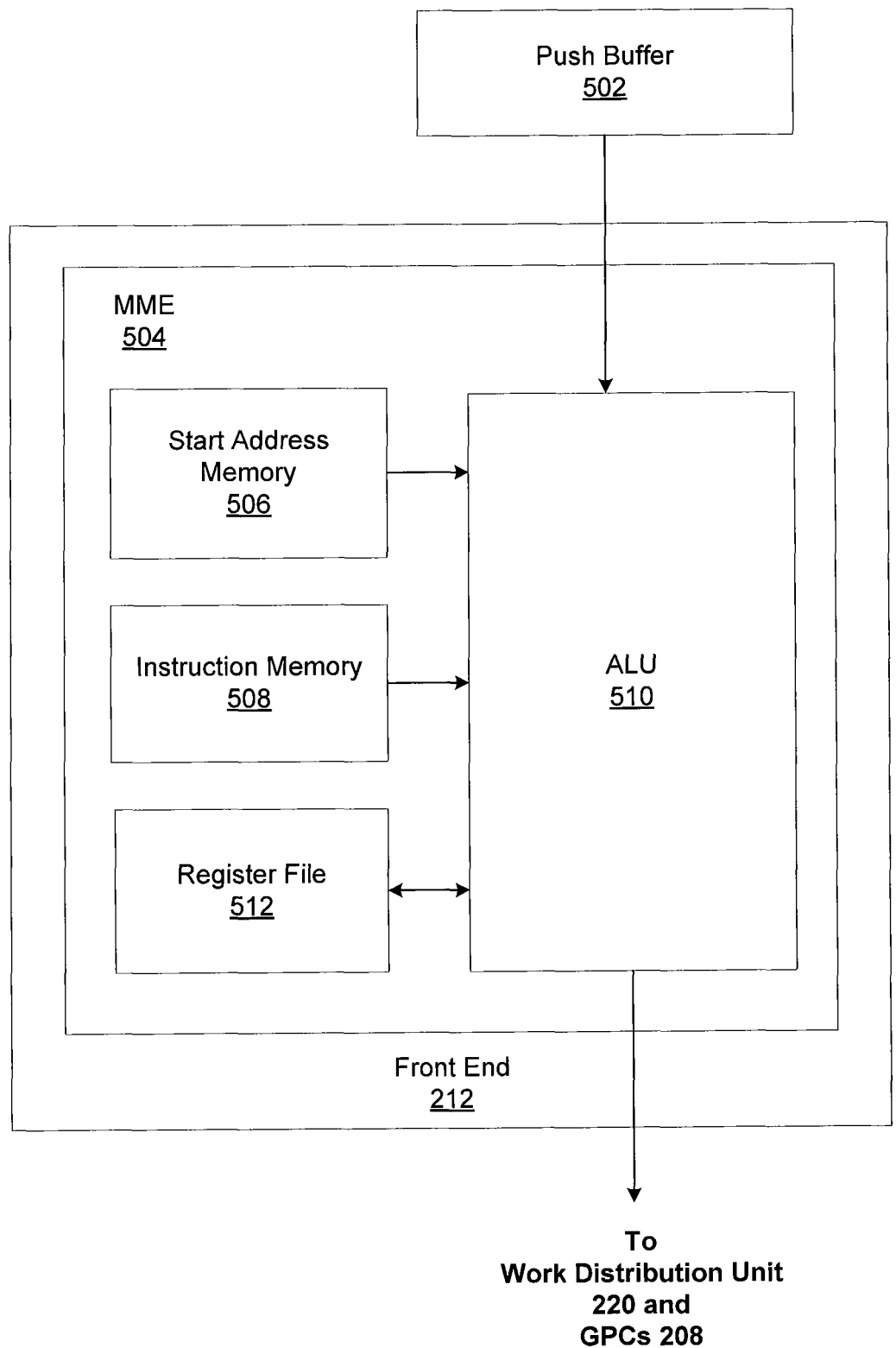
FIG. 5 is a block diagram of a method macro expander (MME) within the FE of FIG. 2, according to one embodiment of the present invention.

FIG. 5 is a block diagram of a method macro expander (MME) 504 within the FE 212 of FIG. 2, according to one embodiment of the present invention. As shown, a push buffer 502 is coupled to the FE 212, and the MME 504 includes a start address memory 506, an instruction memory 508 and arithmetic logic unit (ALU) 510 and a register file 512.

The device driver 103 transmits multiple packets of work to the PPU 202 via the push buffer 502. Those packets of work may be referred to in some cases as "methods". The push buffer 502 may be located in the system memory 104, the parallel processing memory 204, or another storage location accessible to both the CPU 102 and the PPU 202. The PPU 202 reads the packets of work from the push buffer 502 and then executes commands asynchronously relative to the operation of CPU 102. Each packet of work received from the device driver 103 via the push buffer 502 is typically organized as having a header portion and a fixed-size data portion. The header portion indicates the type of operation and/or information about the data portion such as the size and/or the type.

The MME 504 is a programmable processor that is configured to perform method expansion in order to reduce the bandwidth required to deliver state information as well as other packets of work to the CPUs 208. In operation, a packet of work is transmitted by the device driver 103 in a compressed format. The MME 504 expands the single packet of work to different packets of work via a set of instructions stored in an instruction memory 508 internal to the MME 504. The different packets of work are then transmitted for execution to the GPCs 208 and other functional units of the PPU 202 for further processing.

The instruction memory 508 in the MME 504 stores different macros received from the device driver 103. Each macro includes a sequence of instructions that, when executed on a packet of work received from the device driver 103, perform a particular expansion operation. In one embodiment, a macro is implemented using a simple instruction set with a basic 32-bit data path. The instruction set may include instructions to Add, Subtract, Field Extract and Shift, Bitwise Logical Operations, and Branch. A multiple-instruction sequence can be used to perform 64-bit math for operations such as calculating 64-bit virtual addresses. The instructions include the ability to read input parameters passed to the macro from the push buffer 502. To maximize performance, the first input parameter may be made immediately available to the first instruction of the macro so that the first input may be processed without incurring a one-cycle read delay.

In one embodiment, the PPU 202 supports multiple processing channels, allowing multiple independent processes running on the CPU 102 to share control of the PPU 202. One processing channel will control the PPU 202 for some period of time, and then yield control to a second processing channel via a context switch. Unique macros can be defined per processing channel and can be loaded into the instruction memory 508 under the control of the device driver 103. During a context switch, the instruction memory 508 is saved so that different processing channels can run unique macros.

In one embodiment, the address of the first instruction of each macro is stored in the start address memory 506 as a pointer. To initiate the execution of a particular macro, the device driver 103 transmits a packet of work to the MME 504, where the header portion of the packet of work includes a CallMmeMacro command which indicates the offset in the start address memory 506 where the pointer to the first instruction of the macro is stored, and the data portion of the packet contains the first parameter to the macro. Based on the type of macro, the data to be processed by the macro can be transmitted by the device driver 103 as additional packets of work to the MME 504 or can be retrieved from storage locations internal to the MME 504 or from other storage locations. When the device driver 103 transmits additional data to be processed by the macro, the device driver 103 transmits a packet of work where the header portion of the packet of work includes a CallMmeData indicator and the data portion includes one or more input parameters that are to be processed by the instructions of the macro. In another embodiment, the CallMmeMacro command can directly indicate a starting address in the instruction memory 508 and optionally does not have a start address memory 506.

Each instruction of the macro is executed in the ALU 510 based on the input parameters. A program counter keeps track of the instructions in the macro and increments until the end of the macro program is detected or a branch instruction alters the flow of control. The operation that is performed by a particular instruction on one or more input parameters is based on the type of macro expansion being performed. A few examples of different macro expansion operations are discussed below. The packets of work generated by the macro expansion are transmitted to the GPCs 208 and other functional units of the PPU 202 for execution.

The register file 512 includes registers that are used by the ALU 510 to execute the instructions of the macros. In one embodiment, the register file 512 includes eight 32-bit registers and has two read ports and two write ports, each with single cycle access. The registers in the register file 512 are cleared at the beginning of each macro program. This makes the execution of macro programs independent of one another since there is no residual state.

In one embodiment, the MME 504 executes up to one macro instruction word per clock cycle and generates one packet of work for transmission to the GPCs 208 per clock cycle. In addition, the MME 504 can consume up to one input parameter per clock cycle. The MME 504 also allows context switches to occur in the middle of the execution of a macro program by saving its current state when switching away from a processing channel and restoring its state when switching back.

State Objects with Static and Dynamic Properties

As previously described herein, the graphics processing pipeline 400 includes several programmable stages, such as the vertex processing unit 415, and a few fixed-function units, such as the raster operations unit 465. The fixed function units typically have configurable behavior that is controlled via state parameters specified by the application program 101 via the device driver 103.

There are two types of state properties, static and dynamic. Static state properties typically do not vary with a high frequency between different graphics commands that are to be processed by the graphics processing pipeline 400. A static state parameter also, in general, has a smaller set of possible values and has complex interactions with other state properties. Therefore, validation operations need to be performed by the device driver 103 on static state properties prior to transmitting that state information to the graphics processing pipeline 400. Dynamic state properties typically vary with a comparatively higher frequency between different graphics commands. Also, in general, a dynamic state parameter has a comparatively larger set of possible values and is less likely to have complex interactions with other state properties.

In operation, to transmit state information, the application program 101 initializes and populates a state object, and the device driver 103 pushes the state information included in the state object to the graphics processing pipeline 400 for configuring the fixed function units. State objects provide a mechanism to efficiently switch between different sets of fixed-function state, while allowing the device driver 103 to pre-validate and optimize the necessary combinations of state up-front and not having to repeat such validation each time.

Figure 6A:
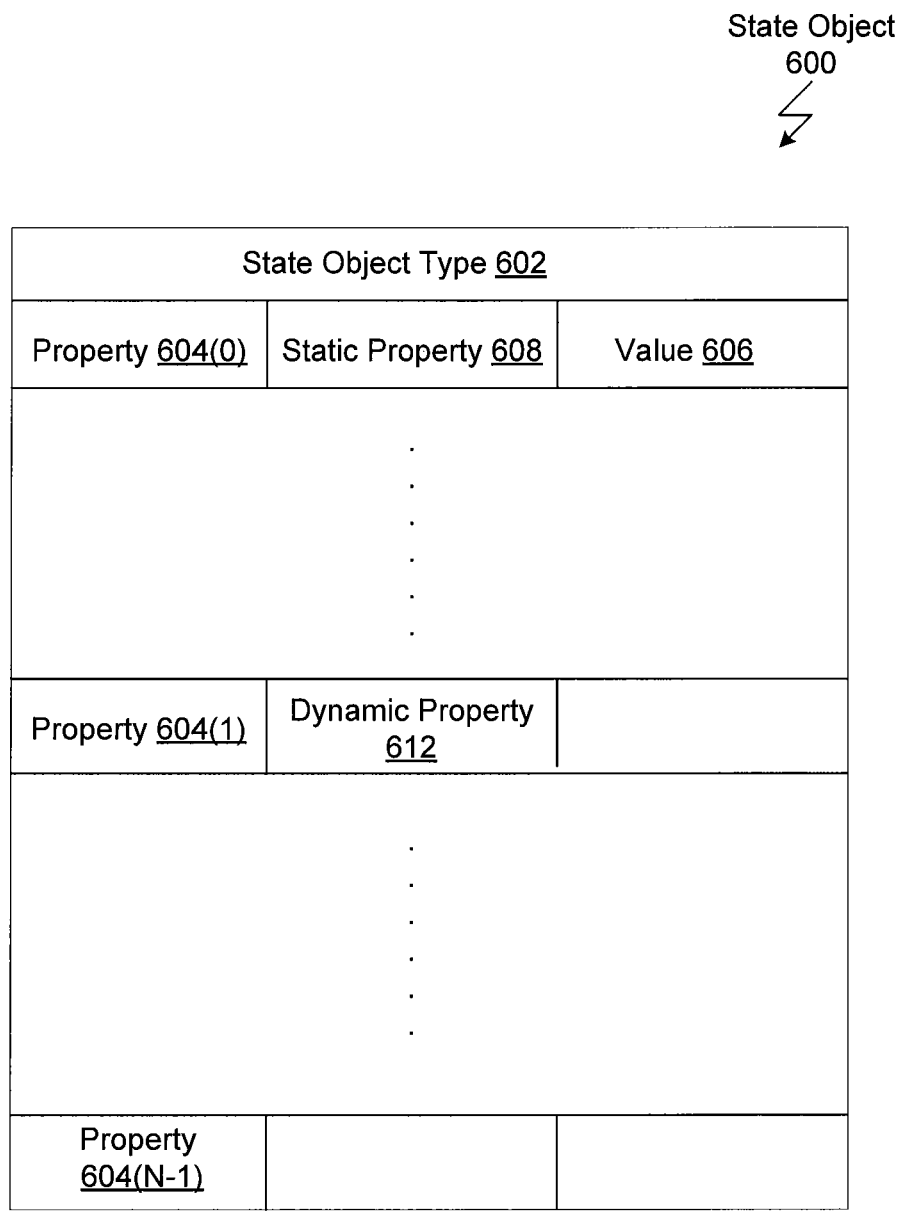
FIG. 6A is a conceptual illustration of a state object configured to store state information related to one or more graphics operations, according to one embodiment of the present invention.

FIG. 6A is a conceptual illustration of a state object 600 configured to store state information related to one or more graphics operations, according to one embodiment of the present invention. As shown, the state object 600 has a state object type 602 and a set of properties 604.

The state object 600 is initialized by the application program 101 and populated via several application program interface (API) calls provided to the application program 101. When the state object 600 is initialized, the application program 101 specifies a state object type 602 associated with the state object 600. The specific properties 604 that can be set by the application program 101 within the initialized state object 600 are determined based on the state object type 602. In one embodiment, the state object type 602 may be "rasterization," "color sample operations," or "depth/stencil sample operations."

Table 1 shows the different properties that can be set for each of the different types of the state object 600 when the state object type 602 is "rasterization."

TABLE 1

| Property Name | Dynamic Allowed? |
| --- | --- |
| POINT_SIZE | Yes |
| POINT_SMOOTH | No |
| POINT_SPRITE | No |
| POINT_SPRITE_COORD_ORIGIN | No |
| LINE_WIDTH | Yes |
| LINE_SMOOTH | No |
| COMBINED_LINE_STIPPLE_NV | Yes |
| LINE_STIPPLE_PATTERN | No |
| LINE_STIPPLE_REPEAT | No |
| LINE_STIPPLE | No |
| CULL_FACE | No |
| CULL_FACE_MODE | No |
| FRONT_FACE | No |
| POLYGON_SMOOTH | No |
| POLYGON_MODE | No |
| POLYGON_OFFSET_FACTOR | Yes |
| POLYGON_OFFSET_UNITS | Yes |
| POLYGON_OFFSET_POINT | No |
| POLYGON_OFFSET_LINE | No |
| POLYGON_OFFSET_FILL | No |
| POLYGON_STIPPLE | No |
| RASTERIZER_DISCARD | No |

Table 2 shows the different properties that can be set for each of the different types of the state object 600 when the state object type 602 is "color sample operations."

TABLE 2

| Property Name | Dynamic Allowed? |
| --- | --- |
| ALPHA_TEST | No |
| ALPHA_TEST_FUNC | No |
| ALPHA_TEST_REF | Yes |
| BLEND | No |
| BLEND_SRC | No |
| BLEND_SRC_RGB | No |
| BLEND_SRC_ALPHA | No |
| BLEND_DST | No |
| BLEND_DST_RGB | No |
| BLEND_DST_ALPHA | No |
| BLEND_EQUATION_RGBA_NV | No |
| BLEND_EQUATION_RGB | No |
| BLEND_EQUATION_ALPHA | No |
| PER_DRAW_BUFFER_BLEND_FUNCTION_NV | No |
| PER_DRAW_BUFFER_BLEND_EQUATION_NV | No |
| PER_DRAW_BUFFER_BLEND_ENABLE_NV | No |
| PER_DRAW_BUFFER_COLOR_WRITEMASK_NV | No |
| BLEND_COLOR | Yes |
| FRAMEBUFFER_SRGB | No |
| DITHER | No |
| COLOR_LOGIC_OP | No |
| LOGIC_OP_MODE | No |
| COLOR_WRITEMASK | No |
| MULTISAMPLE | No |
| SAMPLE_MASK | No |
| SAMPLE_MASK_VALUE | Yes |
| SAMPLE_ALPHA_TO_ONE | No |
| SAMPLE_ALPHA_TO_COVERAGE | No |

Table 3 shows the different properties that can be set for each of the different types of the state object 600 when the state object type 602 is "depth/stencil sample operations."

TABLE 3

| Property Name | Dynamic Allowed? |
| --- | --- |
| DEPTH_TEST | No |
| DEPTH_FUNC | No |
| DEPTH_WRITEMASK | No |
| DEPTH_CLAMP | No |
| DEPTH_BOUNDS_TEST_EXT | No |
| DEPTH_BOUNDS_EXT | Yes |
| STENCIL_TEST | No |
| STENCIL_FUNC | No |
| STENCIL_VALUE_MASK | Yes |
| STENCIL_REF | Yes |
| STENCIL_FAIL | No |
| STENCIL_PASS_DEPTH_FAIL | No |
| STENCIL_PASS_DEPTH_PASS | No |
| STENCIL_WRITEMASK | Yes |
| STENCIL_FRONT_FUNC | No |
| STENCIL_FRONT_VALUE_MASK | Yes |
| STENCIL_FRONT_REF | Yes |
| STENCIL_FRONT_FAIL | No |
| STENCIL_FRONT_PASS_DEPTH_FAIL | No |
| STENCIL_FRONT_PASS_DEPTH_PASS | No |
| STENCIL_FRONT_WRITEMASK | Yes |
| STENCIL_BACK_FUNC | No |
| STENCIL_BACK_VALUE_MASK | Yes |
| STENCIL_BACK_REF | Yes |
| STENCIL_BACK_FAIL | No |
| STENCIL_BACK_PASS_DEPTH_FAIL | No |
| STENCIL_BACK_PASS_DEPTH_PASS | No |
| STENCIL_BACK_WRITEMASK | Yes |

As shown above, certain properties within the state object 600 can be optionally marked as "dynamic" properties, while the remaining properties are "static" properties. For a static property, a value is provided by the application program 101 for that property at the time the state object 600 is initialized, and the value for the static property is stored within the state object 600. For example, property 604(0) is a static property, as specified by the static property flag 608, and the value 606 for property 604(0) is included in the state object 600. By contrast, when a property is marked by the application program 101 as a dynamic property, a value is not provided by the application program 101 for that property. For example, property 604(1) is a dynamic property, as specified by the dynamic property flag 612, and no value for property 604(1) is included in the state object 600.

The application program 101, when populating the state object 600, populates values for each of the static properties 604 and marks any dynamic properties to indicate that those properties should be treated as dynamic properties. Values for the properties that are marked as dynamic properties are provided separately by the application program 101 outside of the state object 600. Such flexibility allows for greater re-use of the state object 600 especially in a multi-threaded environment, where the values for the dynamic properties change frequently.

In one embodiment, when the state object is initialized, each property in the state object 600 has a default value. Therefore, in such an embodiment, the application program 101 does not have to populate a value for each property 604 included in the state object 600.

Once the state object 600 is populated, the application program 101 locks the state object 600 such that no further changes can be made to the state object 600. More specifically, in a locked state, the values of the different static properties 604 within the state object 600 cannot be modified and properties 604 that are marked as dynamic remain so. The state object 600 is then processed by the device driver 103 so that the state information specified by the state object 600 can be passed on to the graphics processing pipeline 400. Since the state object 600 includes only the values of static properties, the device driver 103 can pre-validate and pre-compile the state object 600.

Figure 6B:
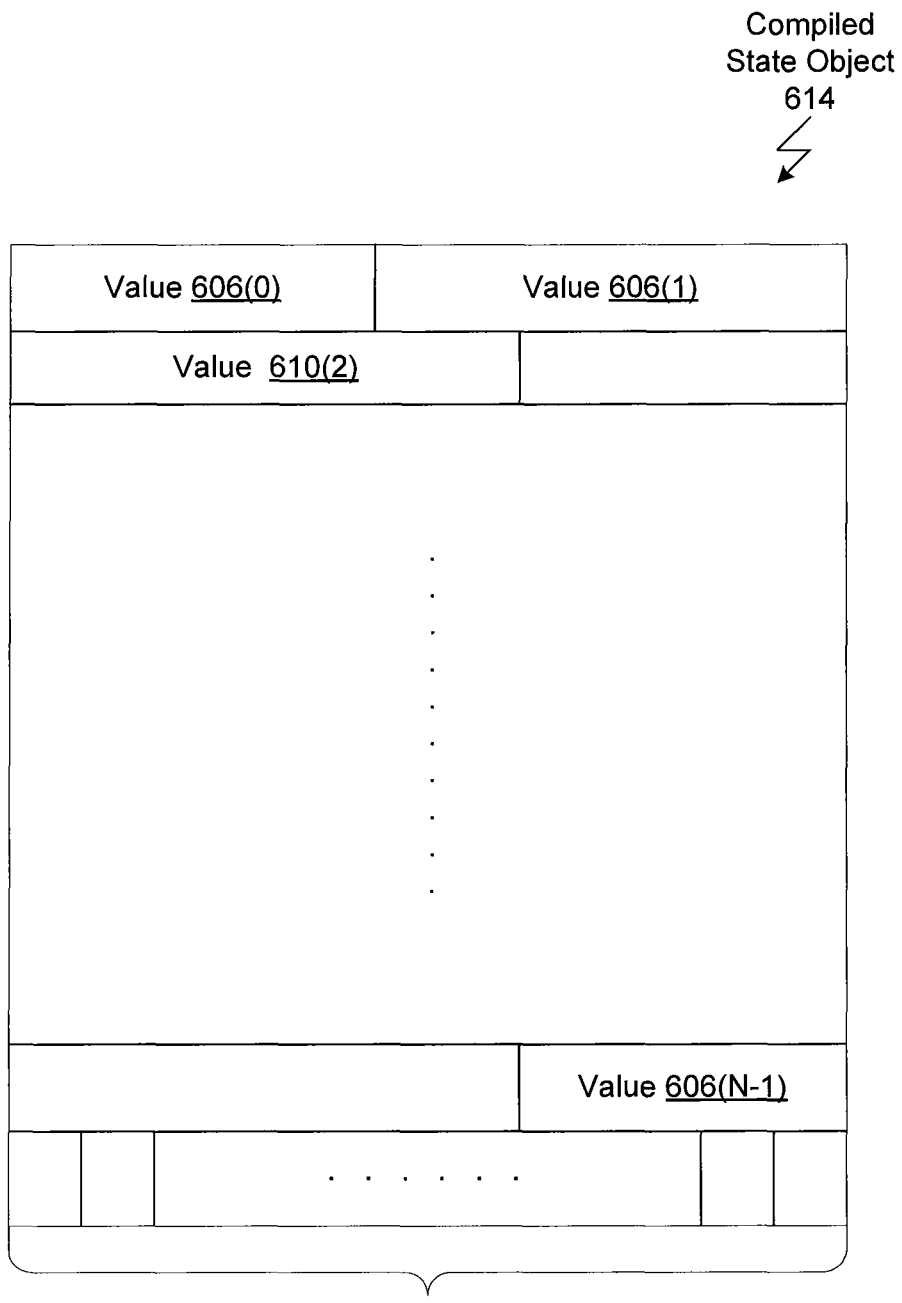
FIG. 6B is a conceptual illustration of a compiled state object configured to store state information related to one or more graphics operations, according to one embodiment of the present invention.

FIG. 6B is a conceptual illustration of a compiled state object 614 configured to store state information related to one or more graphics operations, according to one embodiment of the present invention. As described above, the device driver 103 compiles the state object 600 after the state object 600 has been locked by the application program 101. In one embodiment, during such a compilation process, the compiled state object 614 is generated.

The compiled state object 614 includes the different static values 606 specified by the application program 101 in the state object 600. The compiled state object 614 also includes the bit-field 616 that indicates which state properties are dynamic, based on the dynamic property flags 612. In such an embodiment, the static values 606 and the bit-field 616 are arguments to an MME macro within the MME 504 that is configured to process the compiled state object 614 and cause the relevant state of downstream components to be set accordingly.

In another embodiment, the compiled state object 614 includes a list of pushbuffer commands/data reflective of the state object 600 that, when processed by the PPU 202, cause the relevant state of downstream components to be set accordingly. In yet another embodiment, on hardware that supports programmable ROP, a color sample operations compiled state object 614 may include shader microcode to execute the blend program.

In an embodiment, the state object 600, as stored in memory for transmission to the MME 504, only includes the state values 606 and the dynamic property flags 612, and a different MME unpacking macro is used for each different state object type. The unpacking macro uses the dynamic property flags 612 to determine whether a possibly dynamic state is actually dynamic.

In an embodiment, all the dynamic property flags 612 are packed into a contiguous bit vector within the state object 600.

It is important to note that, because values for dynamic properties are not stored in the state object 600, those values are separately provided by the application program 101 each time the state object 600 is to be used. Such a set-up allows for the state object 600 to be shared between different threads executing within the graphics processing pipeline 400 and across different graphics commands.

In one embodiment, with the MME 504, the device driver 103 supports state objects by loading a state object unpacking macro into the instruction memory 508. The device driver 103 then transmits packets of work that represent the state object 600 storing state information to the MME 504. To indicate to the unpacking macro which properties within the state object are marked as dynamic, the device driver 103 inserts a bit field in one packet of work, where each bit in the bit field indicates whether a corresponding property is marked as dynamic. For each of the static properties, the MME 504, via the state unpacking macro, then unpacks the state object and generates packets of work for the graphics processing pipeline 400 to set the corresponding state in the downstream units. In addition, since the dynamic properties can vary significantly, the MME 504 can be configured with a macro that is able to interpret the dynamic properties without the intervention of CPU 102.

In such an embodiment, the MME 504 also includes state memory (not shown) that is used to track state information associated with device driver 103 and not included in the state object 600. Interactions between state information specified by the state object 600 and the driver state stored tracked by the state memory can then be determined.

Figure 7A:
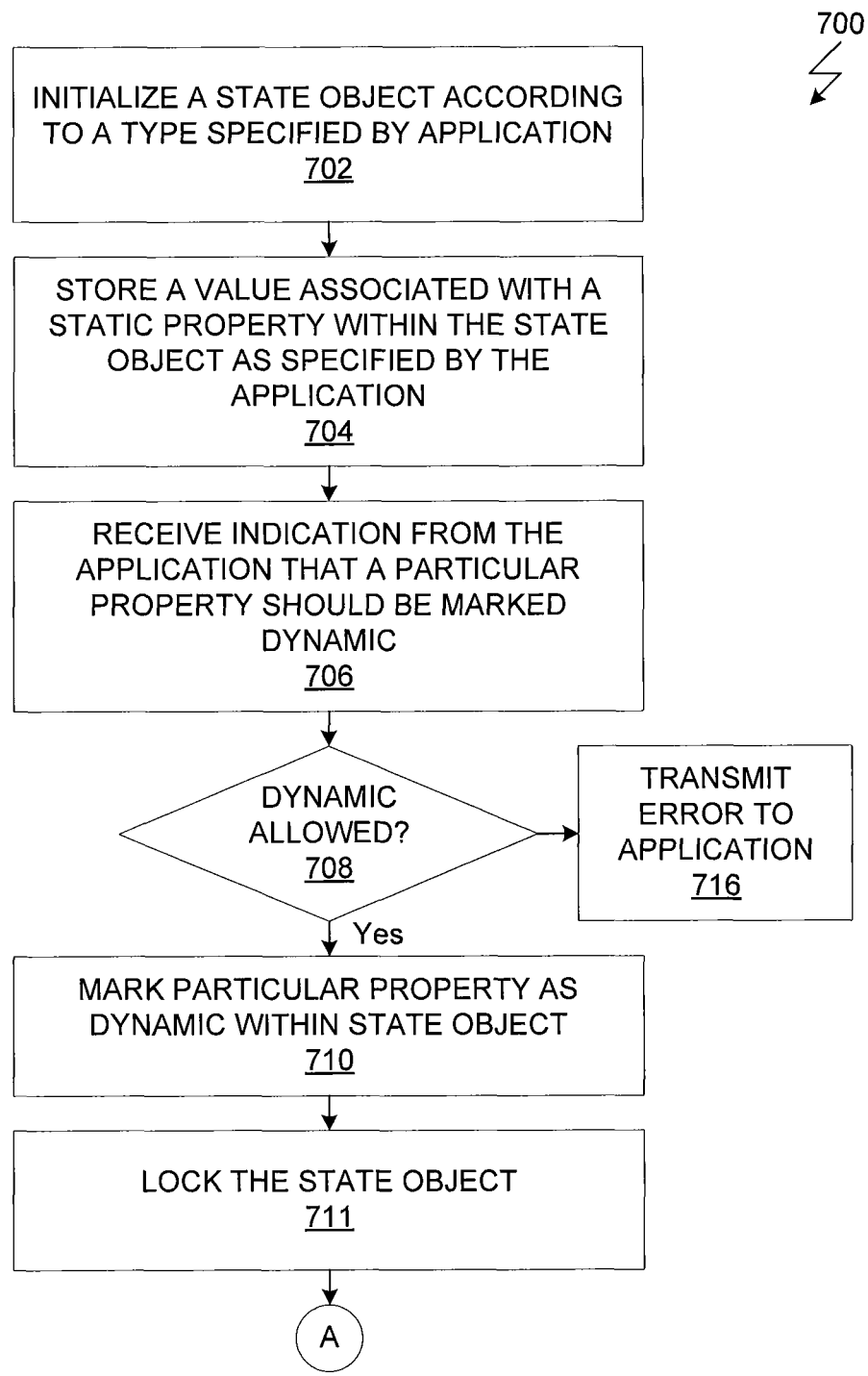
FIGS. 7A and 7B set forth a flow diagram of method steps for proving static and dynamic state information to a graphics processor via a state object, according to one embodiment of the present invention.
Figure 7B:
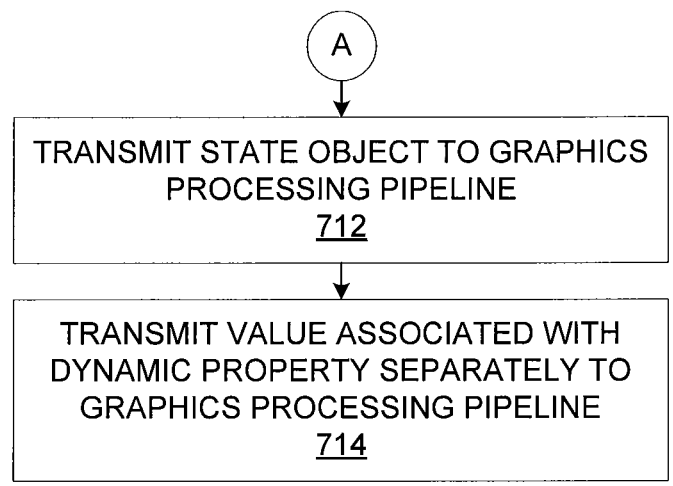

FIGS. 7A and 7B set forth a flow diagram of method steps for proving static and dynamic state information to a graphics processor via a state object, according to one embodiment of the present invention. Although the method steps are described in conjunction with the system for FIG. 1-5, persons skilled in the art will understand that any system configured to perform the method steps, in any order, is within the scope of the invention.

The method 700 begins at step 702, where the device driver 103 initializes a state object 600 according to a type specified by the application program 101 via at least one command of an application program interface (API). At step 704, the device driver 103 stores a value associated with a static property within the initialized state object 600 according to a value specified by the application program 101 via at least one "SetProperty" command of the API.

At step 706, the device driver 103 receives an indication from the application program 101 that a particular property within the state object 600 should be marked as dynamic. At step 708, the device driver 103 determines whether the particular property is allowed to be marked as dynamic. If not, then the method 700 proceeds to step 716, where an error message is transmitted to the application program 101 indicating that the particular property cannot be marked as dynamic.

If, however, at step 708, the particular property is allowed to be marked as dynamic, then the method 700 proceeds to step 710. At step 710, the particular property within the state object 600 is marked as dynamic, such that a value does not need to be provided for that dynamic property before the state object is transmitted to the graphics processing pipeline 400. At step 711, the state object 600 is locked such that no more modifications can be made to the static properties stored in the state object 600 and no other properties can be marked as dynamic.

At step 712, the state object 600 is transmitted to the graphics processing pipeline 400 and any relevant units within the graphics processing pipeline 400 are configured according to the state information specified in the state object 600. At step 714, the value associated with the property that was marked as dynamic at step 710 is specified by the application program 101 and transmitted separately to the graphics processing pipeline 400. In one embodiment, steps 712 and 714 are performed based on the execution of one command.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A computer-implemented method for transmitting state information associated with at least one graphics command to a graphics processor, the method comprising:
    generating a state object that specifies a set of properties that is needed to execute a first graphics command within the graphics processor;
    storing in the state object a value associated with a first property included in the set of properties;
    marking a second property included in the set of properties as a dynamic property, wherein a value associated with the second property is not stored in the state object and can be updated without having to modify the state object; and
    transmitting the state object to the graphics processor in order to execute the first graphics command.

2. The method of claim 1, further comprising transmitting the value associated with the second property to the graphics processor when the first graphics command is transmitted to the graphics processor.

3. The method of claim 1, further comprising locking the state object, wherein the value associated with the first property cannot be modified once the state object is locked.

4. The method of claim 3, further comprising performing one or more validation operations on the value associated with the first property stored within the state object prior to transmitting the state object to the graphics processor.

5. The method of claim 1, wherein the state object is accessed by the graphics processor to execute a second graphics command after executing the first graphics command, where the value associated with the second property is modified before the graphics processor uses the state object to execute the second graphics command.

6. The method of claim 1, wherein the state object is of a first type, and the set of properties specified by the state object is determined based on the first type.

7. The method of claim 1, further comprising compiling the state object, wherein the compiled state object includes a bit-field that indicates that the second property has been marked as a dynamic property.

8. The method of claim 1, further comprising compiling the state object, wherein the value associated with the first property is stored in the compiled state object in a compressed format, and de-compressing, within the graphics processor, the value associated with the first property via at least one macro program specified by the state object.

9. The method of claim 1, wherein the first property is associated with a first default value, and the second property is associated with a second default value.

10. The method of claim 1, wherein the state object specifies at least one macro program that is configured to indicate how the second property should be interpreted by the graphics processor.

11. A non-transitory computer-readable storage medium configured to store instructions that, when executed by a processor, cause the processor to transmit state information associated with at least one graphics command to a graphics processor, by performing the steps of:
    generating a state object that specifies a set of properties that is needed to execute a first graphics command within the graphics processor;
    storing in the state object a value associated with a first property included in the set of properties;
    marking a second property included in the set of properties as a dynamic property, wherein a value associated with the second property is not stored in the state object and can be updated without having to modify the state object; and
    transmitting the state object to the graphics processor in order to execute the first graphics command.

12. The computer-readable storage medium of claim 11, further comprising transmitting the value associated with the second property to the graphics processor when the first graphics command is transmitted to the graphics processor.

13. The computer-readable storage medium of claim 11, further comprising locking the state object, wherein the value associated with the first property cannot be modified once the state object is locked.

14. The computer-readable storage medium of claim 13, further comprising performing one or more validation operations on the value associated with the first property stored within the state object prior to transmitting the state object to the graphics processor.

15. The computer-readable storage medium of claim 11, wherein the state object is accessed by the graphics processor to execute a second graphics command after executing the first graphics command, where the value associated with the second property is modified before the graphics processor uses the state object to execute the second graphics command.

16. The computer-readable storage medium of claim 11, wherein the state object is of a first type, and the set of properties specified by the state object is determined based on the first type.

17. The computer-readable storage medium of claim 11, further comprising compiling the state object, wherein the compiled state object includes a bit-field that indicates that the second property has been marked as a dynamic property.

18. The computer-readable storage medium of claim 11, further comprising compiling the state object, wherein the value associated with the first property is stored in the compiled state object in a compressed format, and de-compressing, within the graphics processor, the value associated with the first property via at least one macro program specified by the state object.

19. The computer-readable storage medium of claim 11, wherein the first property is associated with a first default value, and the second property is associated with a second default value.

20. The computer-readable storage medium of claim 11, wherein the state object specifies at least one macro program that is configured to indicate how the second property should be interpreted by the graphics processor.

21. A system, comprising:
    a memory; and
    a processor, configured to:
        generate a state object that specifies a set of properties that is needed to execute a first graphics command within the graphics processor;
        store in the state object a value associated with a first property included in the set of properties;
        mark a second property included in the set of properties as a dynamic property, wherein a value associated with the second property is not stored in the state object and can be updated without having to modify the state object; and
        transmit the state object to the graphics processor in order to execute the first graphics command.

* * * * *